United States Patent
Tomatis et al.

(10) Patent No.: US 9,591,620 B2
(45) Date of Patent: Mar. 7, 2017

(54) P-CPICH SCRAMBLING CODE COLLISION DETECTION

(71) Applicant: ST-Ericsson SA, Plan-les-Ouates (CH)

(72) Inventors: Fabrizio Tomatis, Saint Laurent du Var (FR); Andrea Ancora, Nice (FR)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 6 days.

(21) Appl. No.: 14/416,666

(22) PCT Filed: Jun. 21, 2013

(86) PCT No.: PCT/EP2013/063036
§ 371 (c)(1),
(2) Date: Jan. 23, 2015

(87) PCT Pub. No.: WO2014/029526
PCT Pub. Date: Feb. 27, 2014

(65) Prior Publication Data
US 2015/0208399 A1 Jul. 23, 2015

(30) Foreign Application Priority Data

Aug. 22, 2012 (EP) .................................. 12290278
May 13, 2013 (EP) .................................. 13167570

(51) Int. Cl.
*H04W 72/04* (2009.01)
*H04W 16/02* (2009.01)
(Continued)

(52) U.S. Cl.
CPC ...... *H04W 72/0406* (2013.01); *H04B 1/7083* (2013.01); *H04L 25/0202* (2013.01);
(Continued)

(58) Field of Classification Search
CPC . H04W 48/20; H04W 16/02; H04W 72/0406; H04L 25/0202; H04L 25/03866; H04B 1/7803; H04B 2201/70701
See application file for complete search history.

(56) References Cited

U.S. PATENT DOCUMENTS 6,657,949 B1 * 12/2003 Jones, IV .............. H04L 5/0053
370/205
8,582,505 B2 * 11/2013 Luo ...................... H04J 11/0056
370/328
(Continued)

FOREIGN PATENT DOCUMENTS

WO 2010/105228 A1 9/2010

OTHER PUBLICATIONS

Qualcomm Europe, "UE-assisted heuristic detection of PCI collision," R2-085380, 3GPP TSG-RAN WG2 meeting #63bis, Agenda Item 5.7.1 (Radio Protocol Extensions); Prague, Czech Republic, Sep. 29-Oct. 3, 2008.

(Continued)

*Primary Examiner* — Ian N Moore
*Assistant Examiner* — Latresa McCallum
(74) *Attorney, Agent, or Firm* — The Danamraj Law Group, P.C.; Thomas L. Crisman; Kenneth A. McClure

(57) ABSTRACT

A method permits a UE receiver to detect and report to the network a scrambling code collision (i.e., two neighbor cells transmitting with the same scrambling code while timing is aligned). The UE receiver decodes the PCCPCH's physical channel with all the associated broadcast information while a scrambling code collision at the UE is present. The UE reports SFN-SFN information to the network, to insure the UE mobility and then prepare the handover to a new detected cell. This process and a respective apparatus are usable in the presence of MIMO and further improve the (Continued)

detection of the scrambling code collision in the presence of MIMO.

8 Claims, 4 Drawing Sheets

(51) Int. Cl.
*H04L 25/02* (2006.01)
*H04L 25/03* (2006.01)
*H04B 1/7083* (2011.01)
*H04W 48/20* (2009.01)

(52) U.S. Cl.
CPC ....... *H04L 25/03866* (2013.01); *H04W 16/02* (2013.01); *H04B 2201/70701* (2013.01); *H04B 2201/70702* (2013.01); *H04W 48/20* (2013.01)

(56) References Cited

U.S. PATENT DOCUMENTS

| | | | | |
|---|---|---|---|---|
| 2006/0209892 | A1* | 9/2006 | MacMullan | H04N 5/775 370/468 |
| 2007/0010268 | A1* | 1/2007 | Kim | H04L 1/0003 455/509 |
| 2007/0260851 | A1* | 11/2007 | Taha | H04W 52/0229 712/204 |
| 2011/0274097 | A1 | 11/2011 | Zhang et al. | |

OTHER PUBLICATIONS

International Search Report issued in corresponding International application No. PCT/EP2013/063036, date of mailing Nov. 8, 2008.

Extended European Search Report issued in corresponding European application No. EP 13 16 7570, date of completion of the search Nov. 4, 2013.

Qualcomm Europe, "UE-assisted heuristic detection of PCI collision," 3GPP Draft; R2-092053, 3GPP TSG-RAN WG2 meeting #65bis, Agenda Item 6.6; Seoul, Korea, Mar. 23-27, 2009.

Holma, Harri, et al., "LTE for UMTS: Evolution to LTE-Advanced," p. 102, Jan. 1, 2011, Wiley, XP055085984.

3GPP, 3rd Generation Partnership Project; Technical Specification Group Radio Access Network; Universal Mobile Telecommunications Systems (UMTS) and LTE; Mobility enhancements for Home Node B (HNB) and Home enhanced Node B (HeNB); Release 11, 3GPP Standard; 3GPP TR 37.803; vol. RAN WG3, No. V11.0.0, Jul. 3, 2012, pp. 1-120, XP050581186.

Holma, Harri, et al., "WCDMA for UMTS—Radio Access for Third Generation Mobile Communications, 3rd Edition," Wiley, Jan. 1, 2001, XP055085654, pp. 103-108.

* cited by examiner

P-CPICH SCRAMBLING CODE COLLISION DETECTION

TECHNICAL FIELD

The invention relates to the field of wireless communication and more particularly to a process for P-CPICH (Primary Common Pilot Channel) scrambling code collision detection and PCCPCH (Primary Common Control Physical Channel) decoding of cells with a colliding scrambling code, and a receiver for doing the same.

BACKGROUND ART

The UMTS (Universal Mobile Telecommunications Service) system is a cellular system and as such its UE (User Equipment) allows mobility inside the network coverage. The UE can then move from one cell to another and thereby change the reference NodeB. When the UE does not have a dedicated connection established with the reference NodeB, the UE can switch from one NodeB to another in function of its measurements. When the UE has an ongoing dedicated connection with the reference NodeB, the handover procedures based on the UE measurements allow the communication to switch from the vanishing reference NodeB to the new reference NodeB without the user noticing it.

The UE measurements performed by the network to insure mobility can be separated into the following categories:
  Intra-frequency measurements which are measurements of downlink physical channels at the same frequency as the active set.
  Inter-frequency measurements which are measurements of downlink physical channels at frequencies that differ from the frequency of the active set.
  Inter-RAT measurements: measurements of downlink physical channels belonging to another radio access technology than UTRAN, e.g. GSM.

In all the three above-mentioned cases, a measurement object corresponds to one cell.

Considering the Intra-frequency measurements, the UE measurement report to the NodeB is based on P-CPICH timing detection and power measurement. The P-CPICHs associated with the different NodeBs, are distinguished by a different scrambling code which is acting as an orthogonal signature.

FIG. 1 shows a scenario with one UE performing measurements on the neighbor cell NodeB 2 while being connected and reporting to the reference NodeB 1.

To insure the mobility, the P-CPICH associated measurements are not enough. The UE should also decode the PCCPCH for reporting the SFN-SFN timing difference.

However, due to the CDMA properties, information sent from different cells using the same scrambling code are orthogonal in relation to each other if the received sequences at the UE are not time aligned. On the other hand, in case of time alignment, the sequences are not orthogonal which is considered as a scrambling code collision.

Also, a UE legacy receiver cannot identify a neighbor P-CPICH nor PCCPCH with identical scrambling code if the timing collision corresponds to the following conditions:
  Neighbor cells are close to each other in time and are received with overlapping delay spread at the UE receiver.
  Neighbor cells are received with identical time at the UE receiver Also, associated with the two cells with the same scrambling code received at the UE with colliding timing, it will be correctly assumed that the transmitted cells information is completely different at the different PCCPCH.

It is an object of the present invention to provide a solution to the above-mentioned problems with the known prior art.

SUMMARY OF THE INVENTION

The invention suggests a method for a PCCPCH decoder to detect cells with colliding scrambling codes comprising the steps of monitoring the scrambling code of a cell, synchronizing with a neighbor cell, detecting a scrambling code collision and flagging it, wherein the method further comprises the step of checking the PCCPCH decoder to determine if correct broadcast information has been applied on the monitored cell.

If the correct broadcast information has been applied on said monitored cell, the method further comprises the step of reconstructing the transmitted PCCPCH sequence to create a new pilot channel estimation to be used for computing the channel estimation on the monitored cell.

The channel estimation of the P-CPICH and the channel estimation of the reconstructed PCCPCH sequence of the monitored cell are combined in order to compute the channel estimation of the newly appearing cell with a colliding scrambling code. The reconstruction of the transmitted PCCPCH sequence can be performed by using a previously recently decoded PCCPCH sequence saved in a memory.

The algorithm for combining the two input channel estimations may consist of subtracting their two inputs with a defined weight for each.

The algorithm for combining the two input channel estimations may further comprise a filtering operation.

The weights and filters are configured to be able to change over time in function of specific parameters such as speed estimation, noise estimation and delay spread estimation.

The reconstruction of the transmitted PCCPCH sequence is performed by starting either from the hard decision at the output of the Viterbi decoder or by using the soft decision extracted from the Viterbi metrics as basis.

The computed channel estimation for the reconstructed PCCPCH transmitted sequence may be performed by means of an algorithm.

The invention further comprises the step of using the computed channel estimation for equalizing the input I, Q data and decoding the PCCPCH of the newly detected cell.

Considering a general scenario 1 deployment, the proposed invention allows the UE receiver to detect and then report the scrambling code collision to the network. By scrambling code collision, it is meant that two neighbor cells are transmitting with the same scrambling code and that their timing is aligned.

Furthermore, the UE receiver is allowed to decode the PCCPCH physical channel with all the associated broadcast information in presence of a scrambling code collision at the UE. It then also allows the UE to report to the network SFN-SFN information, which is necessary to insure the UE mobility and prepare the handover to a new detected cell.

Considering a scenario 2 deployment, the proposed invention is applicable to the presence of MIMO. It further improves the detection of the scrambling code collision using the presence of MIMO.

DESCRIPTION OF THE DRAWINGS

Other features of one or more embodiments of the invention will appear from the following description of the embodiments of the invention, with reference to the accompanying drawings.

A heterogeneous network consists of a specific network deployment where low power nodes (also called Home NodeB HNB) are inserted into a macro cell in order to generally improve throughput and coverage performance.

Figure 1:
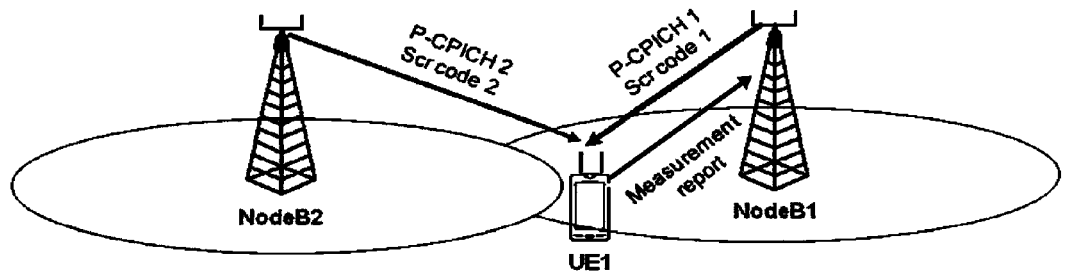
FIG. 1 illustrates the general principle of WVCDMA UE neighbor cell measurements.
Figure 2:
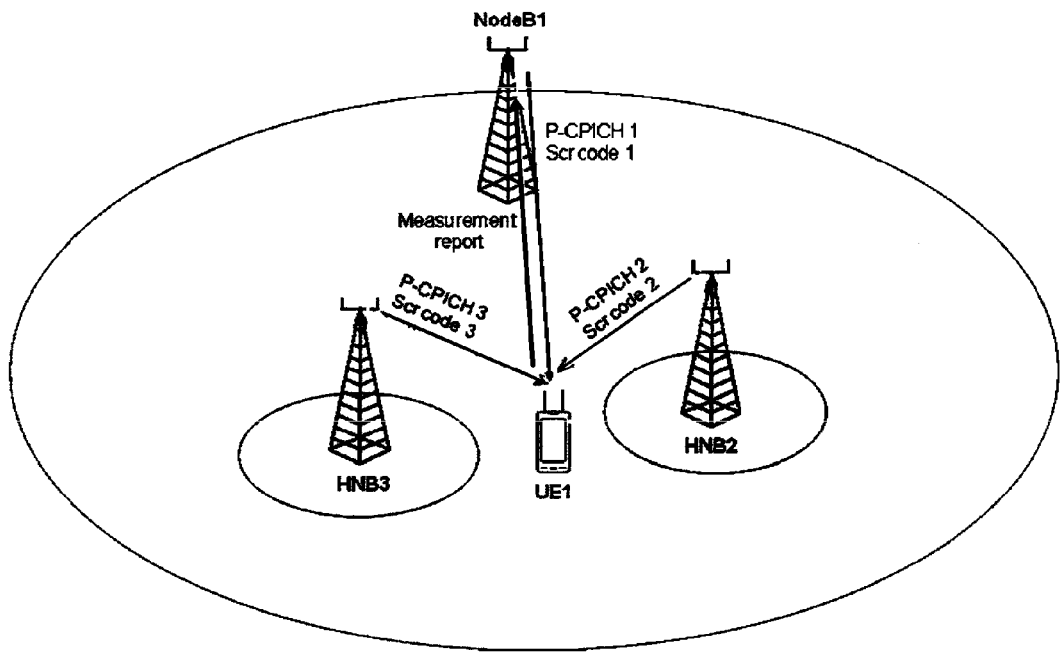
FIG. 2 illustrates the principle of Neighbor cells measurements in HetNet.

In FIG. 2, an example of a heterogeneous network is shown, where two Home NodeBs (HNB2 and HNB3) are deployed inside a macro cell NodeB1. Both the HNB2 and HNB3 are using the same frequency as the main cell while using different codes, which respectively are scrambling code 2 and 3. Scrambling code 2 and 3 are orthogonal. They are also individually orthogonal on the scrambling code 1 used by the NodeB1. In heterogeneous networks, the UE is reporting intra-frequency measurements of main cells as well as of HNBs to ensure mobility.

The UE measurement reporting to the NodeB is normally based on P-CPICH detection, power measurement and PCCPCH decoding. The P-CPICHs associated with the different NodeBs are distinguished by a different scrambling code which is acting as an orthogonal signature. The same applies to the PCCPCH. As shown in the example of FIG. 2, the UE is executing and reporting three P-CPICH based measurements to the reference base station (NodeB 1).

A first scenario and embodiment comprises neighbor cell measurements in HetNet with colliding scrambling codes In the deployment of open and hybrid HNB cells with a given reuse of scrambling code, it may, in some scenarios, happen that the same scrambling code from two or more neighbor HNB cells can be reused.

It is well-known for a person skilled in the art that the UE should be capable of reporting the intra-frequency measurements in order to insure the mobility.

For reporting the intra-frequency measurements, the UE should be capable of receiving the P-CPICH as well as the PCCPCH on the same scrambling code transmitted by two or more neighbor cells HNBs.

Due to the CDMA properties, information sent from different cells using the same scrambling code are orthogonal in relation to each other if the received sequences at the UE are not time aligned. On the other hand, in case of time alignment, the sequences are not orthogonal which is considered as a scrambling code collision.

Figure 3:
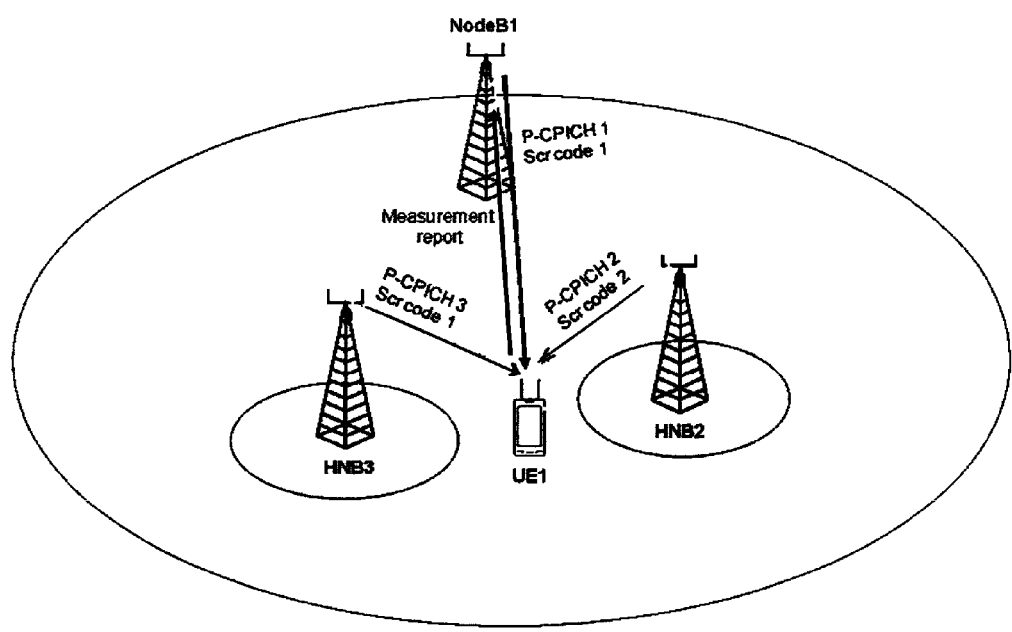
FIG. 3 illustrates a heterogeneous network example, where the HNB3 is using the same scrambling code as of the macro cell NodeB1.

A heterogeneous network example is shown in FIG. 3 where the HNB3 is using the same scrambling code as for the macro cell NodeB1.

A second scenario and embodiment comprises neighbor cell measurements in HetNet with colliding scrambling codes with MIMO deployment.

As a specific case of classical deployment in the neighbor cells HNBs or the main cells, a MIMO activated user can be present. In such scenario, in addition to the normally scheduled P-CPICH pilot channel, an S-CPICH (Secondary Common Pilot channel) is transmitted by the base station in the cell.

The OVSF (Orthogonal Variable Spreading Factor) code associated with the S-CPICH is not specified and it is a reasonable assumption to consider that the S-CPICH associated with a different cell is transmitted with a different OVSF code.

Figure 4:
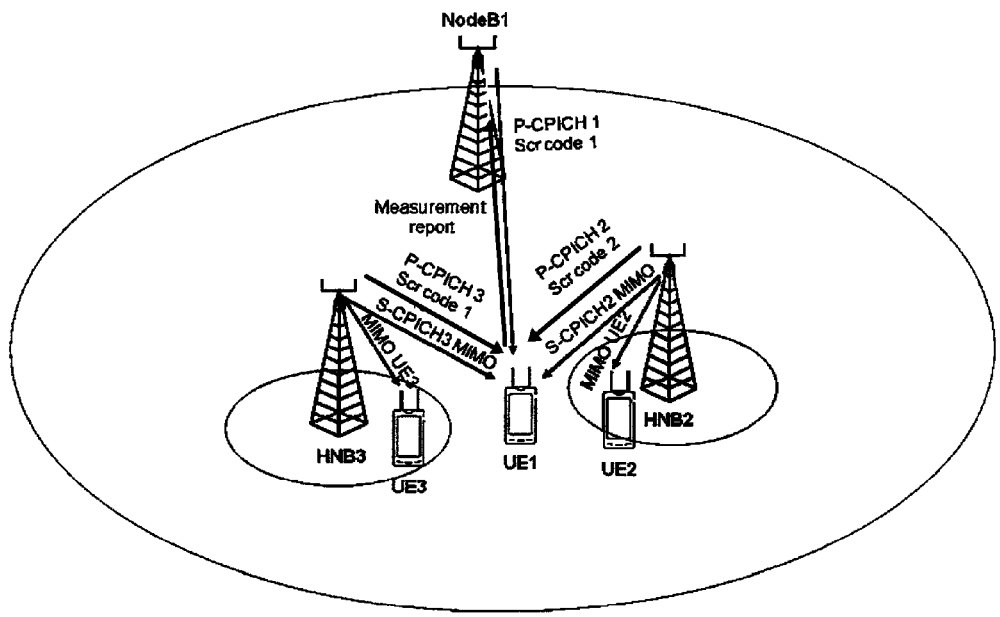
FIG. 4 illustrates a deployment scenario example where the HNB2 and HNB3 have an established MIMO dedicated connection respectively to the UE2 and UE3.

A deployment scenario example is shown in FIG. 4 where the HNB2 and HNB3 have an established MIMO dedicated connection respectively to the UE2 and UE3. As a consequence, an S-CPICH pilot channel is transmitted over the HNB2 and HNB3 cells. The S-CPICH2 and S-CPICH3 are then possibly received by the reference UE.

In these scenarios, a UE legacy receiver can identify neighbor P-CPICH and PCCPCH with the same scrambling code and then report intra-frequency measurements only when the timings of the neighbor cells at the UE receiver satisfy the following conditions:

The P-CPICH and PCCPCH of the neighbor cells are well timely separated if these have the same scrambling code. The time between them should be much larger than the channel delay spread and could for example be a multiple of the channel delay spread time difference.

On the other hand, a UE legacy receiver cannot identify a neighbor P-CPICH nor PCCPCH with identical scrambling code in case of timing collision corresponding to the following conditions:

Neighbor cells close to each other in time with overlapping delay spread at the UE receiver.

Neighbor cells are received with identical sequences at the UE receiver

Also, associated with the two cells with the same scrambling code received at the UE with colliding timing, it will be correctly assumed that the transmitted cells information is completely different at the different PCCPCH.

DESCRIPTION OF THE PREFERRED EMBODIMENT

Assuming that the UE is continuously searching for new neighbor cells and performing measurements, both on new cells and already identified cells: under this assumption we can consider that the scrambling code collision will happen between an already identified cell and a newly detected cell. As a consequence, the monitored NodeB or HNB with colliding scrambling code is already monitored by the UE. Since that the UE is already monitoring the cell, the P-CPICH and the PCCPCH are continuously monitored.

The newly proposed approach for detecting the scrambling code collision consists of the two following functions: firstly, detecting if a S-CPICH with a colliding scrambling code is deployed in the neighbor cell in case of MIMO deployment (scenario 2), and secondly, in the more general scenario 1, detecting by means of the PCCPCH soft metrics, if a new cell with a colliding scrambling code is interfering with the monitored cell.

These functions are detailed in the following paragraph.

This information could then be reported to the network via a specific signaling scheme. In another embodiment, this information may be used by the UE for enabling an improved receiver.

One preferred embodiment of the invention will now be described through the following steps illustrated with the diagram of FIG. 5.

In the main embodiment, the scheme is applied to the detection of new cells using the same scrambling code as already monitored cells and the possible signaling to the network.

The first step is synchronization with one or more neighbor cells. Usually this step is well known by the state of the art and is executed as follows: The UE gets the slot and frame timing of the neighbor cell using the well-known R99 channels P-SCH and S-SCH. SSCH also provides scrambling code group. The UE checks the 8 primary scrambling codes with the detected S-SCH scrambling code group. This can be done using correlation techniques based on P-CPICH. These techniques are well known in the art. The output of this block, a primary scrambling code, is then used in the following blocks (see drawing 5).

Figure 5:
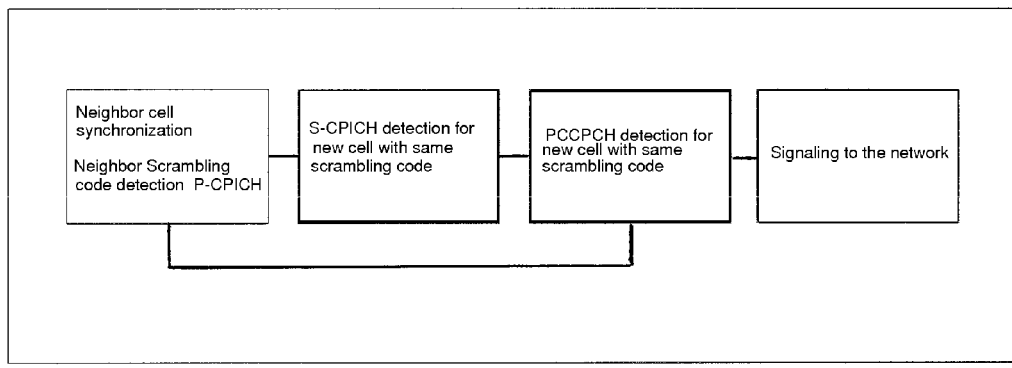
FIG. 5 illustrates the general principle of neighbor cells in HetNet with colliding scrambling codes: UE collision detection and measurements.

The second step is represented in FIG. 5 by the second block labeled "S-CPICH detection block for new cell with same scrambling code". The goal of this block is to detect whether SCPICH is sent to a neighbor cell with a colliding scrambling code. The scrambling code is known as an output of a cell search/monitoring procedure continuously performed at the UE side.

If S-CPICH is detected by the generic detector on an already monitored cell, then a second stage detection is launched in order to detect if a new neighbor cell with MIMO session is activated with the same scrambling code.

Such detector should be capable to distinguish between a new cell with MIMO activated and a new user inside the monitored cell with MIMO activation.

In one embodiment, the ratio of the energy on the SCPICH called RSCP SCPICH and the PCPICH RSCP is compared to a threshold. If the SCPICH is activated inside the monitored cell to support a new user request, the power allocated to the SCPICH will be the same as the PCPICH. Contrarily, if the SCPICH of a neighbor cell is detected for the first time, then the associated power will be much smaller than the power serving the reference cell. Such threshold is smaller than 1 and can be determined based on measurement accuracy which is related to the measurement filtering and the fading environment.

The decision is then defined as:

If the ratio SCPICH RSCP/PCPICH RSCP is bigger than the threshold, then a new MIMO user is enabled in the monitored cell.

If the ratio SCPICH RSCP/PCPICH RSCP is smaller than the threshold, then a new cell MIMO is visible at the UE.

The next step illustrated in FIG. 5 is labeled "PCCPCH detection for new cell with same scrambling code". The goal of this block is to confirm, following the previous functions indication, or to detect, in case no S-CPICH is detected, if a new neighbor cell with a colliding scrambling code is visible at the UE. The scrambling code is known as the output of the cell search/monitoring procedure, continuously performed at the UE side and a PCCPCH decoding is continuously done on monitored cells to read the BCH broadcast channel information.

In one embodiment, a comparison of the soft metrics output of the Viterbi decoder of the PCCPCH in case of a correctly decoded block, i.e. correct CRC (Cyclic Redundancy Code) indication with the P-CPICH RSCP, is performed.

In case a new neighbor cell appears with the same scrambling code as the monitored cell, the SNR (Signal to Noise Ratio) of the decoded signal is degraded due to the non-orthogonal interference on the received signal. Such a degradation will be visible on the PCCPCH with a corresponding degradation of the received BER (Bit Error Rate) and then of the Viterbi decoder output soft metrics.

On the other hand, the energy computed by the P-CPICH RSCP will increase or remain constant due to the newly appearing neighbor cell with the same scrambling code.

The decision is based on the analysis of the relative variations in time of the P-CPICH RSCP and of the PCCPCH Viterbi decoder output soft metrics. As possible implementation, the comparison of a filtered version of the P-CPICH RSCP derivative and of the PCCPCH Viterbi decoder output soft metrics derivative is considered.

The decision is more generally defined as hereafter:

If the PCPICH RSCP variation is going in the opposite direction of the PCCPCH Viterbi decoder output soft metrics then a new cell with same scrambling code is visible at the UE.

If the PCPICH RSCP variation is going in the same direction of the PCCPCH Viterbi decoder output soft metrics, then no new cell with the same scrambling code is visible at the UE.

The last block in FIG. 5 is labeled "Signaling to the network". In this step, the above-mentioned information can be reported to the network via a specific signaling scheme. Such signaling scheme can simply consist of one bit of information associated with the monitored cell (Cell ID) indicating that a new detected cell has a scrambling code colliding with it or more information bits to indicate the combination of colliding scrambling code cells. The network may change the timing of the monitored cell to avoid the collision at the UE side.

Let's consider PCCPCH decoding of one or more newly detected cells in a HetNet with colliding scrambling codes. Assuming again that the UE is continuously searching for new neighbor cells and performing measurements both of new cells and already identified cells, then we can conclude that the scrambling code collision will happen between an already identified cell and newly detected cell.

As a consequence, the monitored NodeB or HNB having a colliding scrambling code is already monitored by the UE. Since the UE is already monitoring the cell, the P-CPICH and the PCCPCH of the dominant cell are continuously monitored.

It is correct to assume that the information transmitted on the two different PCCPCHs corresponding to the two cells is not the same. The innovative proposal exploits this property to reconstruct the channel estimation associated with the dominant cell. As a second innovative step, the UE is subtracting the channel estimation computed on the dominant cell from the channel estimation computed on the P-CPICH in order to recover the channel estimation of the newly appearing cell. The PCCPCH associated with the newly appearing cell is then decoded using the said reconstructed channel estimation.

These functions are detailed in the following chapter.

Figure 6:
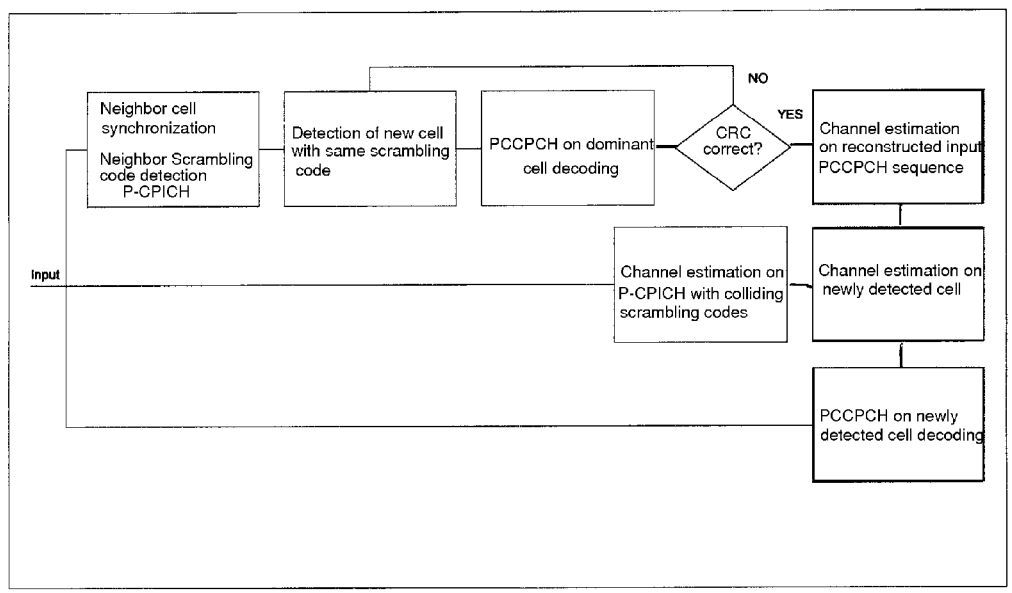
FIG. 6 illustrates the general principle of PCCPCH decoding of newly detected cells in HetNet with colliding scrambling codes.

The preferred embodiment of the invention can be described through the following steps (general description of the algorithm based on the flow diagram in FIG. 6).

In this embodiment, the scheme is applied to decoding of PCCPCH associated with new cells using the same scrambling code as an already monitored cell.

The first step is synchronization with a neighbor cell. Usually this step, well known by state-of the art, is executed as follows. The UE acquires the slot and frame timing of the neighbor cell using the well-known R99 channels P-SCH and S-SCH. SSCH also provides the scrambling code group. The UE checks the 8 primary scrambling codes with the detected S-SCH scrambling code group. This can be done by means of correlation techniques based on P-CPICH. These techniques are well known.

As a second step, the scrambling code collision is detected and signaled to activate the next steps as. If the collision is detected, then the PCCPCH decoding is checked to determine if the correct broadcast information of the dominant cell has been used. If it has, then the following innovative functions are activated. If not, the operation is repeated until a good PCCPCH decoding is reached or a previously recently decoded PCCPCH sequence saved in a memory.

In FIG. 6, after a correct CRC, a block labeled "Channel estimation on reconstructed input PCCPCH sequence" is shown. The goal of this block is to reconstruct the PCCPCH transmitted sequence to create a new pilot channel to be used for computing the channel estimation on the monitored cell, also considered to be the dominant cell. The PCCPCH reconstructed sequence is then used instead of the PCPICH to reduce cell interference of the newly detected same scrambling code.

In one embodiment, the reconstruction of the transmitted PCCPCH sequence may be done by starting either from the hard decision at the output of the Viterbi decoder or a previously recently decoded PCCPCH sequence saved in a memory or by using the soft decision extracted from the Viterbi metrics as basis.

The PCCPCH reconstructed sequence is best used for channel estimation instead of the PCPICH because of the different information transmitted on the two physical channels allowing the UE to distinguish between the two cells sources. This is not possible for the CPICH since the information transmitted in the physical channels is the same from both cells sources which makes it nearly impossible to separate the information.

In one embodiment the channel estimation is done for the reconstructed PCCPCH transmitted sequence using a generic state of the art algorithm.

The next block in FIG. 6 is labeled "Channel estimation on a newly detected cell".

The purpose of this block is to estimate the channel estimation of the newly detected cell with a colliding scrambling code. First of all, the channel estimation on the P-CPICH is done using a state of the art algorithm. Possibly the same algorithm used on the reconstructed PCCPCH sequence to simplify the combining procedure.

In one embodiment, the channel estimation of the P-CPICH and the channel estimation of the reconstructed PCCPCH sequence of the monitored cell are combined in order to compute the channel estimation of the newly appearing cell with a colliding scrambling code.

The algorithm for combining the two input channel estimations consists for example of subtracting the two inputs with a specific weight for each and with a filtering operation. Weights and filters may be changed over time following specific parameters like speed estimation, noise estimation and delay spread estimation.

The last block in FIG. 6 and according to the preferred embodiment of the invention is labeled "PCCPCH on newly detected cell decoding". The purpose of this block is to decode the newly detected cell PCCPCH in order to read the new cell broadcast information and compute the SFN-SFN, which is reported to the serving cell to insure the UE mobility in the network.

In one embodiment, the channel estimation computed by the previous block is used for equalizing the input I, Q data and then allowing decoding of the PCCPCH.

The equalizer used for receiving the PCCPCH sequence may be a classical state of the art equalizer.

The invention allows detecting of a cell with an identical scrambling code, in an open and hybrid HNB cell deployment with a given reuse of scrambling codes. The method works both in case of MIMO enabled cells as well as normal cells and allows more robust cell deployment in a HetNet open network as well as user mobility to be insured in an independent manner in relation to the scrambling code reuse factor. The invention further allows decoding of the PCCPCH of a cell with a colliding scrambling code in an open and hybrid HNB cell deployment with a given reuse of scrambling code.

The invention claimed is:

1. A method for decoding a Primary Common Control Physical Channel, PCCPCH, the method comprising:
   monitoring by a user equipment, UE, a scrambling code transmitted by a target cell;
   synchronizing with a neighbor cell by the UE, to acquire a slot and frame timing of the neighbor cell;
   detecting and flagging, by the UE, a scrambling code collision between the target cell and the neighbor cell;
   checking, by the UE, that broadcast information of the target cell has been applied for decoding the PCCPCH; and
   if the broadcast information of the target cell has been applied, reconstructing, by the UE, a transmitted PCCPCH sequence to create a new pilot channel estimation to be used for computing a channel estimation based on the reconstructed PCCPCH sequence of the target cell,
   wherein a channel estimation of a Primary Common Pilot Channel, P-CPICH, and the channel estimation based on the reconstructed PCCPCH sequence of the target cell are combined in order to compute a channel estimation of a newly appearing cell with a colliding scrambling code, and
   an algorithm for combining the channel estimation of the P-CPICH and the channel estimation based on the reconstructed PCCPCH sequence of the target cell includes subtracting the channel estimation of the P-CPICH and the channel estimation based on the reconstructed PCCPCH sequence of the target cell to which defined weights are applied, respectively.

2. The method according to claim 1, wherein the algorithm further comprises a filtering operation.

3. The method according to claim 1, wherein the defined weights and filters are configured to be able to change over time according to a function of specific parameters including one or more of a speed estimation, a noise estimation and a delay spread estimation.

4. The method according to claim 1, wherein the reconstruction of the transmitted PCCPCH sequence is performed by starting from a hard decision at an output of a Viterbi decoder.

5. The method according to claim 1, wherein the reconstruction of the transmitted PCCPCH sequence is performed by using a soft decision extracted from a Viterbi metrics as basis.

6. The method according to claim 1, wherein the reconstruction of the transmitted PCCPCH sequence is performed by using a previously decoded PCCPCH sequence saved in a memory.

7. The method according to claim 1, wherein the channel estimation based on the reconstructed PCCPCH sequence of the target cell is computed using an algorithm.

8. The method according to claim 1, further comprising using the computed channel estimation based on the reconstructed PCCPCH sequence of the target cell for equalizing input I, Q data and decoding a PCCPCH.

* * * * *